United States Patent Office 3,228,948
Patented Jan. 11, 1966

3,228,948
3β-PHENYL GRANATANE DERIVATIVES
Otto Dold, Lampertheim, Hesse, Kurt Stach, Mannheim, and Wolfgang Schaumann, Mannheim-Woldhof, Germany, assignors to C. F. Boehringer & Soehne G.m.b.H., a corporation of Germany
No Drawing. Filed Aug. 28, 1963, Ser. No. 305,183
Claims priority, application Germany, Oct. 4, 1962, B 69,092
9 Claims. (Cl. 260—293)

This invention relates to a series of new 3-beta-phenyl-granatane derivatives having utility as blood pressure increasing agents. This invention also relates to the process for preparing and using these compounds. More particularly, this invention relates to 3-beta-phenylgranatane derivatives of the formula:

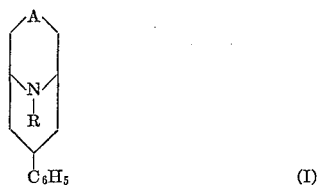

(I)

wherein R is hydrogen, alkyl, alkenyl, aralkyl or aryl and A is a carbonyl group ($>CO$), a hydroxymethylene group ($>CHOH$), its ether or ester derivative, a methylene group ($>CH_2$) or a methine group

The 3-beta-phenylgranatane derivatives of the invention can be produced by condensing 3-phenyl-glutardialdehyde with acetone-dicarboxylic acid and a primary amine of the formula R—$NH_2$ wherein R is as above, the CO group of the 7-beta-phenyl-norgranatanone-(3) thus obtained is thereafter reduced in the conventional manner to a $CH_2$ or CHOH group. The secondary OH group may be etherified or esterified or the OH group can be split off with the formation of a double bond to the adjacent carbon atom.

The condensation of the 3-phenyl-glutardialdehyde with the amine and the acetone-dicarboxylic acid is carried out under the conditions of the Robinson-Schöpf synthesis, under conditions effective to result in condensation and the formation of the phenyl-norgranatone, i.e., in a weakly acid reaction medium, preferably at room temperature or at a slightly elevated temperature of up to 60° C. and in water or in a mixture of water and acetone. The reaction is set forth in the following equation:

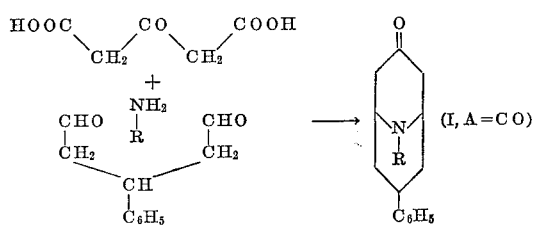

The phenyl-norgranatanones-(3) of Formula I (A=CO) are classified as the 7-beta-series of phenyl-norgranatanones-(3) (Alder et al., Ann., 620, 1959, page 74).

The 3-phenyl-glutardialdehyde employed in the condensation can be prepared by known methods. Thus, 3-phenyl-glutardialdehyde can be made by the method of Longley et al. (J. Am. Soc., 2, 3079 (1950), and 74, 2012 (1952)). According to Longley, cinnamaldehyde is reacted with vinyl-ethylether, the 2-ethoxy-4-phenyl-3,4-dihydro-2H-pyrane (II) thus obtained saponified. This series of reactions is illustrated as follows:

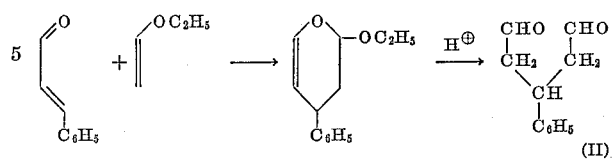

It is not, however, essential to isolate the 3-phenyl-glutardialdehyde from the reaction mixture, the hydrolyzate of the 2-ethoxy-4-phenyl-3,4-dihydro-2H-pyrane (II), which is present in an acid aqueous solution, can be directly employed in the Robinson-Schöpf synthesis, or, alternatively, compound II can be reacted, without prior hydrolysis, with the amine $RNH_2$ and acetone-dicarboxylic acid at a pH of 1-3, whereby the acid reaction medium will act to hydrolyze compound II.

The conversion of the 7-beta-phenyl-norgranatanones-(3) of Formula I (A=CO) to the 3-beta-phenyl-norgranatanes of Formula I (A=$CH_2$) can be conducted by reducing the carbonyl group in the conventional manner as, for instance, by the Wolff-Kishner Reduction Method. When the reduction of compounds I (A=CO) is conducted using sodium in an alcohol as reducing agent, the N-substituted 7-beta-phenyl-norgranatanols-(3-beta) of Formula I (A=CHOH with the OH group in the beta-position) is produced but when the reduction is conducted employing a complex metal hydride or catalytically activated hydrogen as reducing agent, the isomeric N-substituted 7-beta-phenyl-norgranatanols-(3-alpha) of Formula I (A=CHOH with the OH group in the alpha-position) is obtained.

The granatanol derivatives produced in this manner (Formula I, A=CHOH) can be converted into the corresponding ether or ester, Formula I (A=CHOR′ or CHO—COR′ respectively, wherein R′ represents alkyl, aralkyl or aryl). The etherification or esterification is conducted by the conventional methods, as for example by the conversion of alcohol or of the sodium salt thereof (using alkyl halides or acid halides).

The 7-beta-phenyl-norgranatane derivatives of Formula I wherein A represents a methine group

can be prepared by splitting off the OH group of the granatanol derivative (Formula I, A=CHOH) giving rise to a double bond to the adjacent carbon atom. The splitting off of the water is carried out by conventional methods, as for example, by reacting the alcohol (Formula I, A=CHOH) with thionyl chloride and thereafter treating the halogen derivative (Formula I, A=CHCl) produced as an intermediate with a base.

The 3-beta-phenylgranatane derivatives of Formula I in accordance with the invention have been found to possess blood pressure raising properties which are based on their effect on the central nervous system. The mechanism by which the blood pressure increasing action occurs is believed to arise from stimulation of the vasomotor center since it does not take place when the vasomotor system is surgically removed. The hypertensive effective of the compounds of the invention, therefore, cannot be compared with the sympathicomimetics of the prior art which act to increase the blood pressure by means of peripheral vasoconstriction.

In comparison with known central nervous stimulants as, for example, Cardiazol (pentamethylene-tetrazol) and Gevilon (beta,beta-pentamethylene-gamma-hydroxy-sodium butyrate), the compounds of the invention possess no analeptic activity, but nevertheless act to increase the blood pressure in rats, rabbits, and cats in urethane narcosis. Cardiazol or Gevilon are ineffective in this connection even when administered in doses large enough to produce cramps.

The products of the invention represent chemotherapeutic agents lending themselves by virtue of their properties in increasing blood pressure without concomitant analeptic activity, constitute a qualitatively new type of therapeutic agent which can be used with relative safety in the treatment of hypotonia.

The following examples are drawn to illustrate novel compounds of this invention and will serve to illustrate procedures for the preparation of the compounds. It will be readily apparent to one skilled in the art that variations of these procedures are possible.

*Example 1.—7-beta-phenyl-granatanone-(3) (7-beta-phenyl-pseudo-palletierine)*

*Method 1.*—80 grams of 2-ethoxy-4-phenyl-3,4-dihydro-2H-pyrane (prepared by the method of Longley et al. [J. Amer. Soc., 72, 3079 (1950)] by heating cinnamaldehyde and vinyl-ethylether in an autoclave to 180° C.) are dissolved in 200 ml. acetone and refluxed for one hour with 36 ml. water and 8 ml. concentrated hydrochloric acid. The solution of 3-phenyl-glutardialdehyde obtained in this manner is cooled and added dropwise with agitation to a solution of 57.3 g. acetone dicarboxylic acid in 1200 ml. acetone, 26.5 g. methylamine hydrochloride and 13.5 g. sodium acetate (trihydrate) in 200 ml. water. The pH value of the mixture amounts to 3.8. The mixture is permitted to stand four days at room temperature and thereafter it is shaken with concentrated potassium carbonate solution, saturated with solid sodium chloride and extracted with chloroform. The extract is dried and concentrated and the concentrate is fractionated. At a temperature of 140–148° C. (0.5 mm. Hg), 17.0 g. of 7-beta-phenyl-pseudopalletierine distill over (18.9% yield). This fraction hardens and melts, after repeated recrystallization from petroleum ether at 135–137° C. The water soluble hydrochloride of 7-beta-phenyl-pseudopelletierine is obtained by adding ethereal hydrochloric acid to an alcoholic solution of 7-beta-phenyl-pseudopelletierine. The hydrochloride, after repeated recrystallization from alcohol, melts at 235° C. (with decomposition).

*Method 2.*—102.1 grams of 2-ethoxy-4-phenyl-3,4-dihydro-2H-pyrane are dissolved in 2 liters of acetone and the solution mixed with a solution of 75 g. acetone-dicarboxylic acid, 38.7 g. methylamine hydrochloride, and 28.2 g. sodium acetate (trihydrate) in 250 ml. water. The mixture is heated under reflux for 8 hours with agitation. It is thereafter concentrated to ⅓ of the volume, alkalinized with caustic soda solution and the alkaline mixture shaken repeatedly with chloroform. The extract is dried and concentrated and the concentrate distilled, 13.6 grams of 7-beta-phenyl-pseudopelletierine and thus obtained having a B.P. $_{0.8}$ of 160–200° C. (11.9% yield).

*Example 2.—3-beta-phenyl-granatane*

15 grams of 7-beta-phenyl-psuedopelletierine obtained as in Example 1 are heated slowly with 85 ml. triglycol, 14 ml. hydrazine hydrate, 14 g. potassium hydroxide and 2 ml. water with agitation to 250° C. (total heating time about 2 hours). After the residue has cooled, water is added, and the residue extracted with chloroform. The extract is dried, concentrated and the resulting concentrate is distilled. 30.5 g. are thus obtained of a distillate having a B.P. $_{0.2}$ of 125–145° C. The recovered fraction partially crystallizes. By suction filtering, 11.2 g. of solid 3-beta-phenyl-granatane could be obtained. The yield amounts to 79.5%. Because of its great solubility, the base cannot be recrystallized from the usual organic solvents. The corresponding hydrochloride melts at 197–199° C. (from methyl ethyl ketone).

*Example 3.—7-beta-phenyl-granatanol-(3-alpha)*

15.9 grams of the 7-beta-phenyl-psuedopelletierine obtained according to the procedure of Example 1 are dissolved in 150 ml. absolute tetrahydrofuran and slowly added drop-wise and with agitation to a solution of 1.7 g. lithium aluminum hydride in 200 ml. absolute tetrahydrofuran. Thereafter the mixture is heated for another 5 hours under reflux. 20 ml. sodium chloride solution are added slowly (drop by drop at first) with stirring to the reflux mixture. The precipitated aluminum hydroxide is removed by suction filtering, and the filtrate dried and concentrated. Distillation of the concentrate produces 11.7 grams of 7-beta-phenyl-granatanol-(3-alpha) having a boiling point $_{0.1}$ of 160–170° C. The yield amounts to 72.7 g. The corresponding hydrochloride melts at 266° C. (with decomposition (from isopropanol)).

*Example 4.—7-beta-phenyl-granatanol-(3-beta)*

34.4 grams of the 7-beta-phenyl-pseudopelletierine obtained according to the procedure of Example 1 are dissolved in 600 ml. of ethanol 47 grams of sodium in small portions are slowly added to the solution whereupon the mixture begins to boil. When all the sodium has been dissolved, the mixture is refluxed for one hour. 100 ml. of water are added, and the resulting mixture is concentrated to ¼ of its volume. Thereafter 500 ml. of water are added to the resulting concentrate and the mixture is extracted with methylene chloride. The extract is dried and concentrated. 28.4 grams of 7-beta-phenyl-granatanol-(3-beta) having a melting point of 129–130° C. (from petroleum ether having a boiling point of 100–140° C.) are obtained as a residue. The yield amounts to 81.8%. The corresponding hydrochloride melts at 280–281° C. (from ethanol).

*Example 5.—7-beta-phenyl-3-alpha-acetoxy-granatane*

21.5 ml. of acetyl chloride are slowly added to a solution of 34.7 g. (0.15 mol) 7-beta-phenyl-granatanol-(3-alpha) (obtained according to the procedure set out in Example 3) and 28 g. tri-n-butylamine in 170 ml. benzene, and the resulting mixture heated for 4 hours under reflux. Thereafter the excess acetyl chloride is decomposed with 200 ml. of water, and the mixture is made alkaline with caustic soda solution and extracted with benzene. The resulting extract is concentrated and the concentrate distilled. From the distillation there are obtained 36.6 g. 7-beta-phenyl-3-alpha-acetoxy-granatane having a boiling point $_{0.3}$ of 160–185° C. The yield amounts to 78.9%. The corresponding hydrochloride prepared in the conventional manner melts at 236–238° C. (from isopropanol).

*Example 6.—N-benzyl-7-beta-phenyl-norgranatanone-(3)*

2-ethoxy-4-phenyl-3,4-dihydro-2H-pyrane is hydrolyzed by the procedure set out in Example 1, Method I, above and reacted with acetone dicarboxylic acid and benzylamine at a pH of 3–4. N-benzyl-7-beta-phenyl-norgranatanone-(3) having a boiling point$_1$ of 228–235° C. and a melting point of 89–91° C. (from petroleum ether) is thereby obtained with a yield of 35.4%. The corresponding hydrochloride melts at 239° C. (with decomposition (from isopropanol)).

*Example 7.—N-benzyl-3-beta-phenyl-norgranatane*

23.7 grams of the N-benzyl-7-beta-phenyl-norgranatanone-(3) prepared according to the procedure of Example 6 are added to a mixture of 15.5 ml. hydrazine hydrate, 1.6 ml. water, 15.5 g. potassium hydroxide and 100 ml. triglycol. The mixture is slowly heated with stirring to 250° C. Any easily volatile products are condensed and separated by means of a descending condenser. The remaining reaction mixture is diluted with 400 ml. water and extracted with chloroform. The extract is dried and concentrated. The concentrate is distilled. 13.0 grams of N-benzyl-3-beta-phenyl-norgranatane having a boiling point$_{1.2}$ of 205–215° C. are obtained. The yield amounts to 57.5%. The base recrystallized from methanol has a melting point of 84–86° C. The hydrochloride melts at 200–202° C. (from methyl ethyl ketone).

*Example 8.—N-allyl-7-beta-phenyl-norgranatanone-(3)*

Following the procedure set out in Example 1 above (Method I) the hydrolyzate of 2-ethoxy-4-phenyl-3,4-dihydro-2H-pyrane is reacted with acetone dicarboxylic acid and allylamine at a pH of 3–4. A 42.3% yield of N-allyl-3-beta-phenyl-norgranatanone-(3) having a boiling point$_{0.2}$ of 175–200° C. and a melting point of 74–76° C. (from petroleum ether), is thus obtained. The hydrochloride melts at 264° C. (with decomposition (from methanol and a little water)).

In order to evaluate the therapeutic effectiveness of the compounds of the invention, namely their effect on administration, comprising both the resultant activity and toxicity, if any, the following procedures were conducted:

(1) *Acute toxicity in the mouse.*—The test compounds were injected intravenously and the LD–50 was determined 24 hours after injection.

(2) *Acute toxicity in the rat.*—In rats, under urethane narcosis, the test compounds were intravenously infused until the animals were killed. Each of the results, given in this respect in the table, represents an average of 4–5 experiments.

(3) *Blood pressure increase in the rat.*—The blood pressure was measured during the determination of the acute toxicity. It was observed that it increased at first and then decreased toward the end of the infusion. The doses which produced an optimum blood pressure increase are set out in the table.

(4) *Circulatory effect in the cat.*—In the cat, the intravenous injection of the test compounds was observed with respect to increase in blood pressure. An increase in blood pressure and vascular resistance of varying duration was observed.

The following table shows the doses which produced an optimum increase in blood pressure without concomitant toxic phenomena.

The following compounds of the invention were employed in the evaluation:

A=7-beta-phenyl-granatanone-(3)
B=3-beta-phenyl-granatane
C=7-beta-phenyl-granatanol-(3-alpha)
D=7-beta-phenyl-granatanol-(3-beta)
E=7-beta-phenyl-3-alpha-acetoxy-granatane In addition compound F (3-beta phenyltropane) which constitutes a tropane derivative was employed as a standard and basis of comparison. Its blood pressure increasing effect on dogs has been described by Lands and Archer (Journal of Medicinal and Pharmaceutical Chemistry 2, 449–460, 1960).

As can be seen from the table in all of the test procedures the standard compound 3-beta-phenyl-tropane was found to be 2–3 times less effective than the corresponding granatane. The toxicity in the mouse and the rat is a direct consequence of the nicotine-like stimulation, and therefore, it must be considered as a measure of the effectiveness of the substances. Compounds, 7-beta-phenyl-granatanol-(3-alpha) and 7-beta-phenyl-3-alpha-acetoxy-granatane, were found to be less effective than the compounds 7-beta-phenyl-granatanone-(3) and 3-beta-phenyl-granatane with respect to blood pressure increasing effect, but were more effective in maintaining the effect, to wit, following intravenous injection of these compounds in the cat, the blood pressure increase persisted for a substantially longer period.

According to the invention, the novel 3-beta-phenyl-granatane derivatives may be used to provide compositions for use in the treatment of hypotension. The 3-beta-phenyl-granatane derivatives may be associated with a carrier which may be either a solid material or a sterile parenteral liquid. The compositions may take the form of tablets, powders, capsules, or other dosage forms, which are particularly useful for oral ingestion. Liquid diluents are employed in sterile condition for parenteral use, that is, by injection. Such a medium may be a sterile solvent, such as water. The compositions may take the form of active material, namely 3-beta-phenyl-granatane derivative, mixed with a solid or liquid diluent, with or without further agitants. The percentage of active ingredient in the composition may be varied. It is necessary that the active ingredient constitute proportions such that a suitable dosage will be obtained. Obviously, several unit dosage forms may be administered at about the same time. Activity increases with concentration of phenyl-granatane derivative.

What is claimed is:
1. 7-beta-phenyl-granatanone-(3).
2. 3-beta-phenyl-granatane.
3. 7-beta-phenyl-granatanol-(3-alpha).
4. 7-beta-phenyl-granatanol-(3-beta).
5. 7-beta-phenyl-3-alpha-acetoxy-granatane.
6. A chemical compound represented by the structural formula:

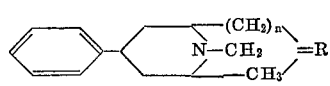

TABLE

| Compound | R | $n$ | LD–50 Mouse, Mg./kg. i.v. | LD–50 Rat, Mg./kg. i.v. | Optimum blood pressure increasing doses | | |
|---|---|---|---|---|---|---|---|
| | | | | | Rat, Mg./kg. | Cat | |
| | | | | | | Mg./kg. | Min. |
| A | =O | 1 | 10.5 | 18.8 | 9.4 | 1.0 | 5 |
| B | H$_2$ | 1 | 0.45 | 0.77 | 0.14 | 0.05 | 5 |
| C | HOH [1] | 1 | 27.5 | 32.5 | 9.4 | 2.0 | 20 |
| D | HOH [2] | 1 | 24.5 | | | 2.0 | |
| E | HOCOCH$_3$ [3] | 1 | 14.6 | 32.5 | 7.1 | 3.0 | 20 |
| F | H$_2$ | 0 | 1.16 | 2.12 | 0.43 | 0.15 | 5 |

[1] 7-beta-3-alpha-form.  [2] 7-beta-3-beta-form.  [3] 7-beta-3-alpha-form.

wherein R is a member selected from the group consisting of hydrogen, methyl, benzyl, and allyl, and A is a member selected from the group consisting of a carbonyl group (>CO) and a hydroxymethylene group (>CHOH).

7. N-benzyl-7-beta-phenyl-norgranatanone-(3).
8. N-benzyl-3-beta-phenyl-norgranatane.
9. N-allyl-7-beta-phenyl-norgranatanone (3).

References Cited by the Examiner

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,425,320 | 8/1947 | Hill | 252—149 |
| 2,606,155 | 8/1952 | Hill | 252—149 |
| 2,932,646 | 4/1960 | Biel | 260—294.7 |
| 2,956,059 | 10/1960 | Renz et al. | 260—294.3 |
| 2,986,573 | 5/1961 | Topliss et al. | 167—65 |
| 2,987,442 | 6/1961 | McLean et al. | 167—65 |

OTHER REFERENCES

Cope et al., "J. Am. Chem. Society," vol 73, pages 3419–3424 (1951).

NICHOLAS S. RIZZO, *Primary Examiner.*